US012311682B2

(12) United States Patent
Sumii

(10) Patent No.: US 12,311,682 B2
(45) Date of Patent: May 27, 2025

(54) LIQUID EJECTION APPARATUS, CONTROL METHOD FOR LIQUID EJECTION APPARATUS, AND PROGRAM

(71) Applicant: SEIKO EPSON CORPORATION, Tokyo (JP)

(72) Inventor: Atsushi Sumii, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 223 days.

(21) Appl. No.: 18/154,673

(22) Filed: Jan. 13, 2023

(65) Prior Publication Data

US 2023/0226836 A1 Jul. 20, 2023

(30) Foreign Application Priority Data

Jan. 17, 2022 (JP) ................................. 2022-004978

(51) Int. Cl.
*B41J 29/17* (2006.01)

(52) U.S. Cl.
CPC ..................................... *B41J 29/17* (2013.01)

(58) Field of Classification Search
CPC ........... B41J 29/17; B41J 29/38; B41J 29/393
See application file for complete search history.

(56) References Cited

U.S. PATENT DOCUMENTS

2021/0291559 A1* 9/2021 Aoki ........................ B41J 29/17

FOREIGN PATENT DOCUMENTS

JP 2001-179953 A 7/2001
JP 2007-054999 A 3/2007

* cited by examiner

*Primary Examiner* — Bradley W Thies
(74) *Attorney, Agent, or Firm* — WORKMAN NYDEGGER

(57) ABSTRACT

The controller of a liquid ejection apparatus is configured to execute a cleaning operation of cleaning the transport belt by the cleaning member and a recovery operation of recovering cleaning capability of the cleaning member by rotating the transport belt in a state where the cleaning member contacts the transport belt.

15 Claims, 8 Drawing Sheets

LIQUID EJECTION APPARATUS, CONTROL METHOD FOR LIQUID EJECTION APPARATUS, AND PROGRAM

The present application is based on, and claims priority from JP Application Serial Number 2022-004978, filed Jan. 17, 2022 the disclosure of which is hereby incorporated by reference herein in its entirety.

BACKGROUND

1. Technical Field

The present disclosure relates to a liquid ejection apparatus that ejects liquid onto a medium. The present disclosure also relates to a control method of a liquid ejection apparatus and a program.

2. Related Art

Liquid ejection apparatuses, represented by an ink jet printer, have a known configuration in which a medium, represented by recording paper, is transported using a transport belt, and in some cases a configuration is adopted in which the transport belt to which ink clings is cleaned by a blade.

The blade described in JP-A-2001-179953 is formed by coating urethane rubber with fluorine resin, and is provided so as to be able to come into contact with and separate from the transport belt.

The amount of water of the ink adhered to the blade evaporates with the passage of time, and the ink becomes fixed to the blade. Even if an attempt is made to clean the transport belt using the blade to which ink has become fixed in this manner, there is a possibility that an appropriate cleaning effect cannot be obtained.

SUMMARY

In order to overcome the above-described problems, a liquid ejection apparatus according to the present disclosure includes a liquid ejection section configured to eject liquid onto a medium, a transport belt that faces the liquid ejection section and that is configured to transport a medium by rotating, a cleaning member that is configured to clean the transport belt by contact with the transport belt and that is switchable between a contact state of contacting the transport belt and a separated state of being separated from the transport belt, and a controller configured to control an operation of ejecting liquid using the liquid ejection section, a rotation operation of the transport belt, and state switching of the cleaning member, wherein the controller is configured to execute a cleaning operation of cleaning the transport belt by the cleaning member and a recovery operation of recovering cleaning capability of the cleaning member by rotating the transport belt in a state where the cleaning member contacts the transport belt.

A control method of a liquid ejection apparatus according to the present disclosure, wherein the liquid ejection apparatus includes a liquid ejection section configured to eject liquid onto a medium, a transport belt that faces the liquid ejection section and that is configured to transport a medium by rotating, and a cleaning member that is configured to clean the transport belt by contact with the transport belt and that is switchable between a contact state of contacting the transport belt and a separated state of being separated from the transport belt, the control method including a step of executing a cleaning operation of cleaning the transport belt by the cleaning member and a step of executing a recovery operation of recovering a cleaning capability of the cleaning member by rotating the transport belt in a state in which the cleaning member contacts the transport belt on or after an elapsed time from execution of the cleaning operation reaches a set time.

A non-transitory computer-readable storage medium according to the present disclosure stores a program to be executed by a controller of a liquid ejection apparatus, wherein the liquid ejection apparatus, includes a liquid ejection section configured to eject liquid onto a medium, a transport belt that faces the liquid ejection section and that is configured to transport a medium by rotating, and a cleaning member that is configured to clean the transport belt by contact with the transport belt and that is switchable between a contact state of contacting the transport belt and a separated state of being separated from the transport belt, the program including a step of executing a cleaning operation of cleaning the transport belt by the cleaning member and a step of executing a recovery operation of recovering a cleaning capability of the cleaning member by rotating the transport belt in a state in which the cleaning member contacts the transport belt when an elapsed time from execution of the cleaning operation reaches a set time.

DESCRIPTION OF EMBODIMENTS

Figure 1:
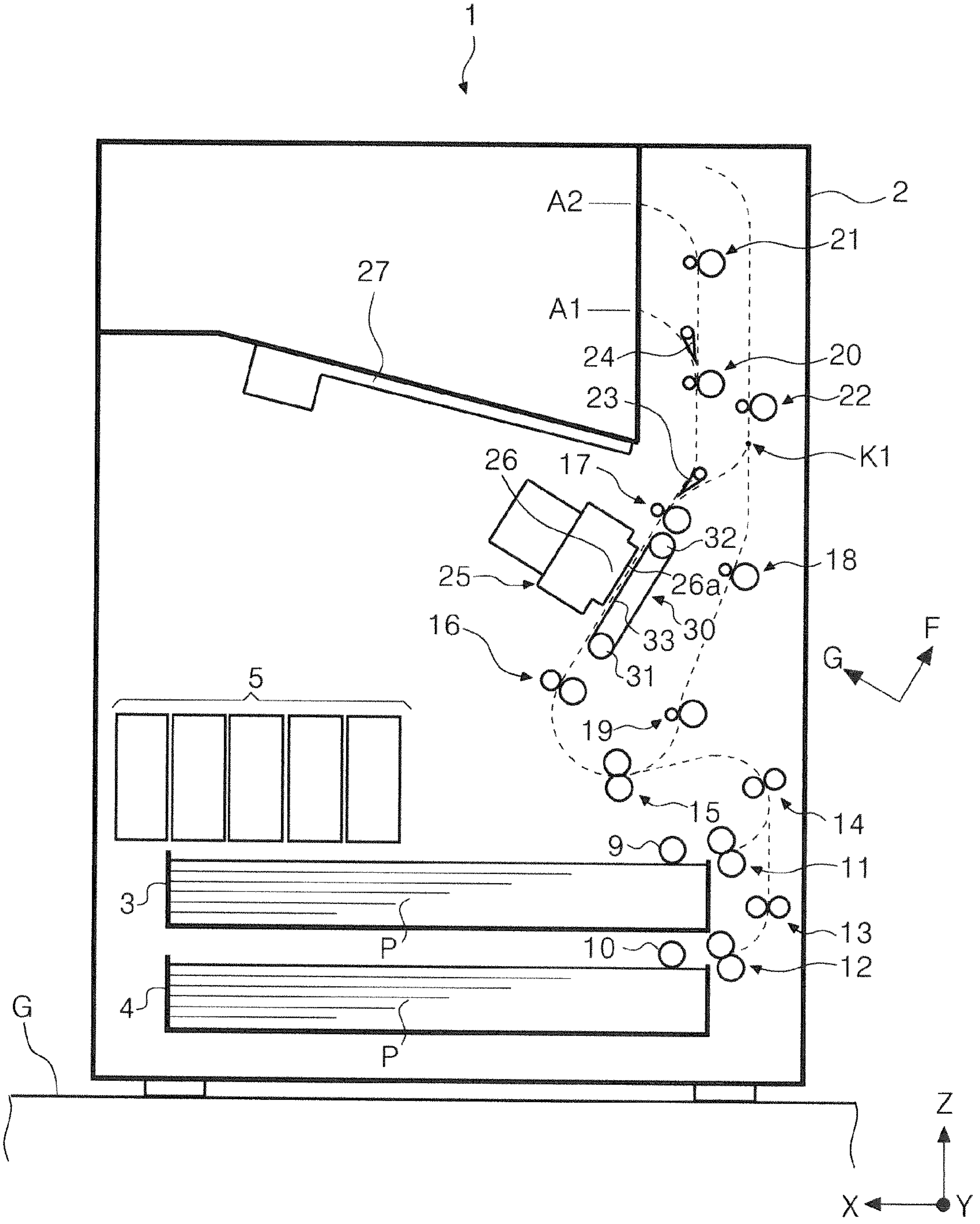
FIG. 1 is a diagram illustrating a medium transport path of a printer.

The present disclosure will be described in general terms.

A liquid ejection apparatus according to a first aspect includes a liquid ejection section configured to eject liquid onto a medium, a transport belt that faces the liquid ejection section and that is configured to transport a medium by rotating, a cleaning member that is configured to clean the transport belt by contact with the transport belt and that is switchable between a contact state of contacting the transport belt and a separated state of being separated from the transport belt, and a controller configured to control an operation of ejecting liquid using the liquid ejection section, a rotation operation of the transport belt, and state switching of the cleaning member, wherein the controller is configured to execute a cleaning operation of cleaning the transport belt by the cleaning member and a recovery operation of recovering cleaning capability of the cleaning member by rotating the transport belt in a state where the cleaning member contacts the transport belt.

According to this aspect, since the controller is configured to execute a cleaning operation of cleaning the transport belt by the cleaning member and a recovery operation of recovering cleaning capability of the cleaning member by rotating the transport belt in a state where the cleaning member contacts the transport belt, it is possible to remove at least a part of the remaining liquid by the recovery operation when the liquid remains on the cleaning member. By this, the cleaning ability of the cleaning member can be recovered, and the transport belt can be appropriately cleaned.

Note that liquid removed from the cleaning member by the recovery operation includes liquid adhering to the cleaning member in a state of slight or insignificant evaporation of water, liquid adhering to the cleaning member in a state of increased viscosity due to the progress of water evaporation, and liquid adhering to the cleaning member in a state in which most of the water evaporated and it is solidified, and that at least one of these is removed from the cleaning member by the recovery operation.

A second aspect is the first aspect, characterized in that the controller executes the recovery operation after executing the cleaning operation and on or after a timing when an amount of water in the liquid on the cleaning member falls below a predetermined amount of water on or after a timing.

After executing the cleaning operation, the amount of water in the liquid on the cleaning member decreases due to evaporation. According to this aspect, since the controller executes the recovery operation when an amount of water in the liquid on the cleaning member falls below a predetermined amount of water on or after a timing after executing the cleaning operation, it is possible to suppress execution of the unnecessary recovery operations, and it is possible to suppress shortening of the life of the cleaning member.

A third aspect is the second aspect, characterized in that the controller determines the timing based on an elapsed time from execution of the cleaning operation.

According to this aspect, since the controller determines the timing based on an elapsed time from execution of the cleaning operation, it is easy to manage the timing.

A fourth aspect is the second or third aspect, characterized in that a detection section is provided configured to acquire at least one of humidity or temperature, wherein when the humidity is acquired and the humidity is a first humidity, the controller sets a time until the timing is reached to be shorter than when the humidity is a second humidity higher than the first humidity and when the temperature is acquired and the temperature is a first temperature, the controller sets the time until the timing is reached to be shorter than when the temperature is a second temperature lower than the first temperature.

The amount of water in the liquid remaining on the cleaning member is influenced by at least one of humidity or temperature. For example, the lower the humidity or the higher the temperature, the more significant the water evaporation of the liquid. According to this aspect, since the controller adjusts the timing based on at least one of the humidity or the temperature, it is possible to make the timing of executing the recovery operation more appropriate.

A fifth aspect is any one of the second to fourth aspects, characterized in that the controller executes the cleaning operation when liquid is erroneously ejected from the liquid ejection section onto the transport belt and when an ejection duty at time of an erroneous ejection is a first ejection duty, the controller sets the time until the timing is reached to be shorter than when the ejection duty is a second ejection duty that is higher than the first ejection duty.

The amount of water in the liquid remaining on the cleaning member is influenced by the ejection duty when liquid is erroneously ejected from the liquid ejection section onto the transport belt. According to this aspect, since the controller adjusts the timing based on the ejection duty, it is possible to make the timing of executing the recovery operation more appropriate.

A sixth aspect is the second aspect, characterized in that the controller determines the timing by calculating an amount of water in the liquid.

According to this aspect, since the controller determines the timing by calculating the amount of water in the liquid, it is possible to make the timing of executing the recovery operation more appropriate. In addition, it is possible to suppress execution of the unnecessary recovery operations, and it is possible to suppress shortening of the life of the cleaning member.

A seventh aspect is any one of the first to sixth aspects, characterized in that the recovery operation includes a first mode in which the transport belt is moved with respect to the cleaning member at a first speed and a second mode in which the transport belt is moved with respect to the cleaning member at a second speed higher than the first speed.

According to this aspect, since the recovery operation includes a first mode in which the transport belt is moved with respect to the cleaning member at a first speed and a second mode in which the transport belt is moved with respect to the cleaning member at a second speed higher than the first speed, it is possible to suppress wear of the cleaning member by the first mode while reliably obtaining the effect of the recovery operation by the second mode.

An eighth aspect is in any one of the first to seventh aspects, characterized in that the recovery operation includes an operation of a speed change mode in which a moving speed of the transport belt with respect to the cleaning member is periodically changed.

According to this aspect, since the recovery operation includes an operation of a speed change mode in which a moving speed of the transport belt with respect to the cleaning member is periodically changed, a bending motion is added to the cleaning member, so the effect of removing the liquid remaining on the cleaning member can be enhanced.

It should be noted that periodically changing the moving speed of the transport belt means, for example, repeating acceleration and deceleration of the moving speed so as to change the moving speed in a rectangular wave shape.

A ninth aspect is any one of the first to eighth aspects, characterized in that the controller is configured to execute, as the cleaning operation, a first cleaning operation and a second cleaning operation having a cleaning effect higher than that of the first cleaning operation and when the cleaning operation is performed in between performing the cleaning operation and performing the recovery operation, the first cleaning operation is selected until a predetermined operation switching timing is reached, and the second cleaning operation is selected after the operation switching timing is reached.

When the cleaning operation is performed in between performing the cleaning operation and performing the recovery operation, the longer the elapsed time from when the cleaning operation was performed, the more the viscosity of the liquid remaining on the cleaning member increases, so there is a concern that the cleaning capability decreases while cleaning the transport belt.

According to this aspect, the cleaning operation is performed in between performing the cleaning operation and performing the recovery operation, after a predetermined operation switching timing the controller selects the second cleaning operation having a higher cleaning effect than the first cleaning operation. As a result, the transport belt can be appropriately cleaned by compensating for a decrease in the cleaning ability of the cleaning member.

A tenth aspect is the ninth aspect, characterized in that the controller is configured to increase at least one of a cleaning time, a contact pressure of the cleaning member with respect to the transport belt, or a moving speed of the transport belt with respect to the cleaning member to be greater in the second cleaning operation than in the first cleaning operation.

According to this aspect, since the controller is configured to increase at least one of a cleaning time, a contact pressure of the cleaning member with respect to the transport belt, or a moving speed of the transport belt with respect to the cleaning member to be greater in the second cleaning operation than in the first cleaning operation, it is possible to easily realize the second cleaning operation having a higher cleaning effect than the first cleaning operation.

An eleventh aspect is any one of the first to tenth aspects, characterized in that the cleaning member is a first cleaning member, and a second cleaning member that cleans the transport belt by contacting the transport belt is provided downstream of the cleaning member in a moving direction of the transport belt.

According to this aspect, since the cleaning member is a first cleaning member and a second cleaning member is further provided in addition to the first cleaning member, it is possible to more reliably clean the transport belt.

A control method of a liquid ejection apparatus according to according to a twelfth aspect, wherein the liquid ejection apparatus includes a liquid ejection section configured to eject liquid onto a medium, a transport belt that faces the liquid ejection section and that is configured to transport a medium by rotating, and a cleaning member that is configured to clean the transport belt by contact with the transport belt and that is switchable between a contact state of contacting the transport belt and a separated state of being separated from the transport belt, the control method including executing a cleaning operation of cleaning the transport belt by the cleaning member and executing a recovery operation of recovering a cleaning capability of the cleaning member by rotating the transport belt in a state in which the cleaning member contacts the transport belt on or after an elapsed time from execution of the cleaning operation reaches a set time.

According to this aspect, when liquid remains on the cleaning member, at least a portion of the remaining liquid can be expected to be removed by the recovery operation. By this, the cleaning ability of the cleaning member can be recovered, and the transport belt can be appropriately cleaned.

A non-transitory computer-readable storage medium according to a thirteenth aspect stores a program to be executed by a controller of a liquid ejection apparatus, wherein the liquid ejection apparatus includes a liquid ejection section configured to eject liquid onto a medium, a transport belt that faces the liquid ejection section and that is configured to transport a medium by rotating, and a cleaning member that is configured to clean the transport belt by contact with the transport belt and that is switchable between a contact state of contacting the transport belt and a separated state of being separated from the transport belt, the program including executing a cleaning operation of cleaning the transport belt by the cleaning member and executing a recovery operation of recovering a cleaning capability of the cleaning member by rotating the transport belt in a state in which the cleaning member contacts the transport belt on or after an elapsed time from execution of the cleaning operation reaches a set time.

According to this aspect, when liquid remains on the cleaning member, at least a portion of the remaining liquid can be expected to be removed by the recovery operation. By this, the cleaning ability of the cleaning member can be recovered, and the transport belt can be appropriately cleaned.

Hereinafter, the present disclosure will be specifically described.

Hereinafter, an ink jet printer 1 that performs recording by ejecting a liquid, represented by ink, onto a medium, represented by recording paper, will be described as an example of a liquid ejection apparatus. Hereinafter, the ink jet printer 1 will be referred to simply as a printer 1.

An X-Y-Z coordinate system illustrated in the drawings is an orthogonal coordinate system, and a Y-axis direction is a width direction intersecting a transport direction of a medium and is an apparatus depth direction. Note that with respect to the Y-axis direction, the +Y direction is a direction from the front surface of the apparatus toward the rear surface of the apparatus, and the −Y direction is a direction from the rear surface of the apparatus toward the front surface of the apparatus.

The X-axis direction is the apparatus width direction, the +X direction, which is the direction in which the arrow faces when viewed from the operator of the printer 1, is the left side, and the −X direction opposite thereto is the right side. The Z-axis direction is a vertical direction, that is, an apparatus height direction, a +Z direction, in which an arrow is directed, is an upward direction, and a −Z direction opposite thereto is a downward direction.

Further, the G-axis direction is a normal direction with respect to an ink ejection surface 26*a* of a line head 26 (to be described later). In addition, the F-axis direction is a direction parallel to the ink ejection surface 26*a* and is a medium transport direction at a position facing the ink ejection surface 26*a*, a +F direction, which is a direction in which the arrow is directed, is a transport direction downstream, and a −F direction opposite thereto is a transport direction upstream. Hereinafter, a direction in which a medium is fed may be referred to as "downstream", and a direction opposite thereto may be referred to as "upstream".

In some drawings, an F-G-Y coordinate system is used instead of the X-Y-Z coordinate system.

In FIG. 1, a medium transport path is indicated by broken line. In the printer 1, the medium is transported through the medium transport path indicated by broken line.

A device main body 2 of the printer 1 includes a first medium cassette 3 and a second medium cassette 4 that store medium before it is fed. Reference character P denotes medium accommodated in each medium cassette. The first medium cassette 3 and the second medium cassette 4 are provided so as to be attachable to and detachable from the device main body 2 from the apparatus front side.

The first medium cassette 3 is provided with a feeding pickup roller 9 for sending out the stored medium, and the second medium cassette 4 is provided with a pickup roller 10 for sending out the stored medium.

A feed roller pair 11 for feeding the fed medium obliquely upward is provided for the first medium cassette 3. A feed roller pair 12 for feeding the fed medium obliquely upward and a transport roller pair 13 for transporting the medium upward are provided for the second medium cassette 4.

Unless otherwise specified, a "pair of rollers" in the following description includes a driving roller driven by a motor (not shown) and a driven roller driven to rotate by contact with the driving roller.

Medium sent out from the medium cassettes is sent to a transport roller pair 16 by a transport roller pair 14 and a transport roller pair 15. Medium that receives the feeding force from the transport roller pair 16 is fed to a position between the line head 26 and the transport belt 33, that is, to a position facing the line head 26.

The head unit 25 is provided with the line head 26, and the line head 26 executes recording by ejecting ink, which is an example of liquid, onto a surface of a medium. The line head 26 is an ink ejection head configured such that nozzles (not shown) that eject ink cover the entire region in the medium width direction, and is configured as an ink ejection head capable of performing recording on the entire region in the medium width direction without moving in the medium width direction. The line head 26 is an example of a liquid ejection section that ejects liquid.

However, the ink ejection head may be of a type that performs recording with movement in the medium width direction.

Reference numeral 5 denotes an ink storage section for storing ink. Ink to be ejected from the line head 26 is supplied from the ink storage section 5 to the line head 26 via a tube (not shown). The ink storage section 5 includes a plurality of ink tanks arranged along the X-axis direction.

The transport belt 33, the drive pulley 31, and the driven pulley 32 constitute a belt unit 30. The transport belt 33 is an endless belt wound around a drive pulley and a driven pulley 32. The transport belt 33 rotates when the drive pulley 31 is driven by a belt drive motor 57 (refer to FIG. 2).

The medium is transported to a position facing the line head 26 while clinging to the transport belt 33. Clinging of the medium to the transport belt 33 will be described again later. Here, the medium transport path passing through the position facing the line head 26 intersects both the horizontal direction and the vertical direction, and is configured to transport the medium in an obliquely upward direction. This obliquely upward transport direction is a direction including a −X direction component and a +Z direction component in FIG. 1, and with such a configuration, it is possible to suppress the horizontal direction dimension of the printer 1.

In the present embodiment, the medium transport path passing through the position facing the line head 26 is set at an inclination angle in a range of 50° to 70° with respect to the horizontal direction, and more specifically, is set at an inclination angle of 60°.

Medium on which recording has been performed on the first surface by the line head 26 is further transported in an obliquely upward direction by a transport roller pair 17 positioned downstream of the transport belt 33.

A flap 23 is provided downstream of the transport roller pair 17, and the transport direction of the medium is switched by the flap 23. When the medium is to be discharged as is, the transport path of the medium is switched by the flap 23 toward an upper transport roller pair 20. A flap 24 is further provided on the downstream side of the transport roller pair 20, and the transport path is switched by the flap 24 to either discharge from a discharge position A1 or transport to the transport roller pair 21 positioned further vertically upward. When the medium is sent toward the transport roller pair 21, the medium is discharged from a discharge position A2.

Medium discharged from the discharge position A1 is received by the discharge tray 27, which inclines in an obliquely upward direction including +X direction components and +Z direction components. Medium discharged from the discharge position A2 is received by an optional tray (not shown).

When recording is to be further performed on the second surface of the medium in addition to the first surface, the medium is fed by the flap 23 in an obliquely upward direction including −X-direction components and +Z-direction components, passes through the branch position K1, and is fed from the branch position K1 to an upper switch-back path. A transport roller pair 22 is provided in the switch-back path, and the medium that has entered the switch-back path is transported upward by the transport roller pair 22 and when the upstream end of the medium passes through the branching position K1, the rotation direction of the transport roller pair 22 is switched, so that the medium is transported downward.

The medium transported downward by the transport roller pair 22 receives a feeding force from the transport roller pair 18, the transport roller pair 19, and the transport roller pair 15, reaches the transport roller pair 16, and is again transported to the transport belt 33 by the transport roller pair 16.

The medium that was again fed to the position facing the line head 26 faces the line head 26 with its second surface, which is the opposite surface from the first surface on which recording has already been performed. By this, recording by the line head 26 can be performed on the second surface of the medium. The medium on which recording has been performed on the second surface is discharged from the discharge position A1 or the discharge position A2 described above.

Next, the belt unit 30, a first cleaning section 35, and a second cleaning section 40 will be described with reference to FIGS. 3 and 4.

The transport belt 33 constituting the belt unit 30 is an endless belt formed by including a conductive material, as needed to adjust a resistance value, in a base material formed of urethane, rubber, or the like and is wound around the drive pulley 31 on the upstream side and the driven pulley 32 on the downstream side. A predetermined tension is applied to the transport belt 33 by a tensioner (not shown).

Figure 2:
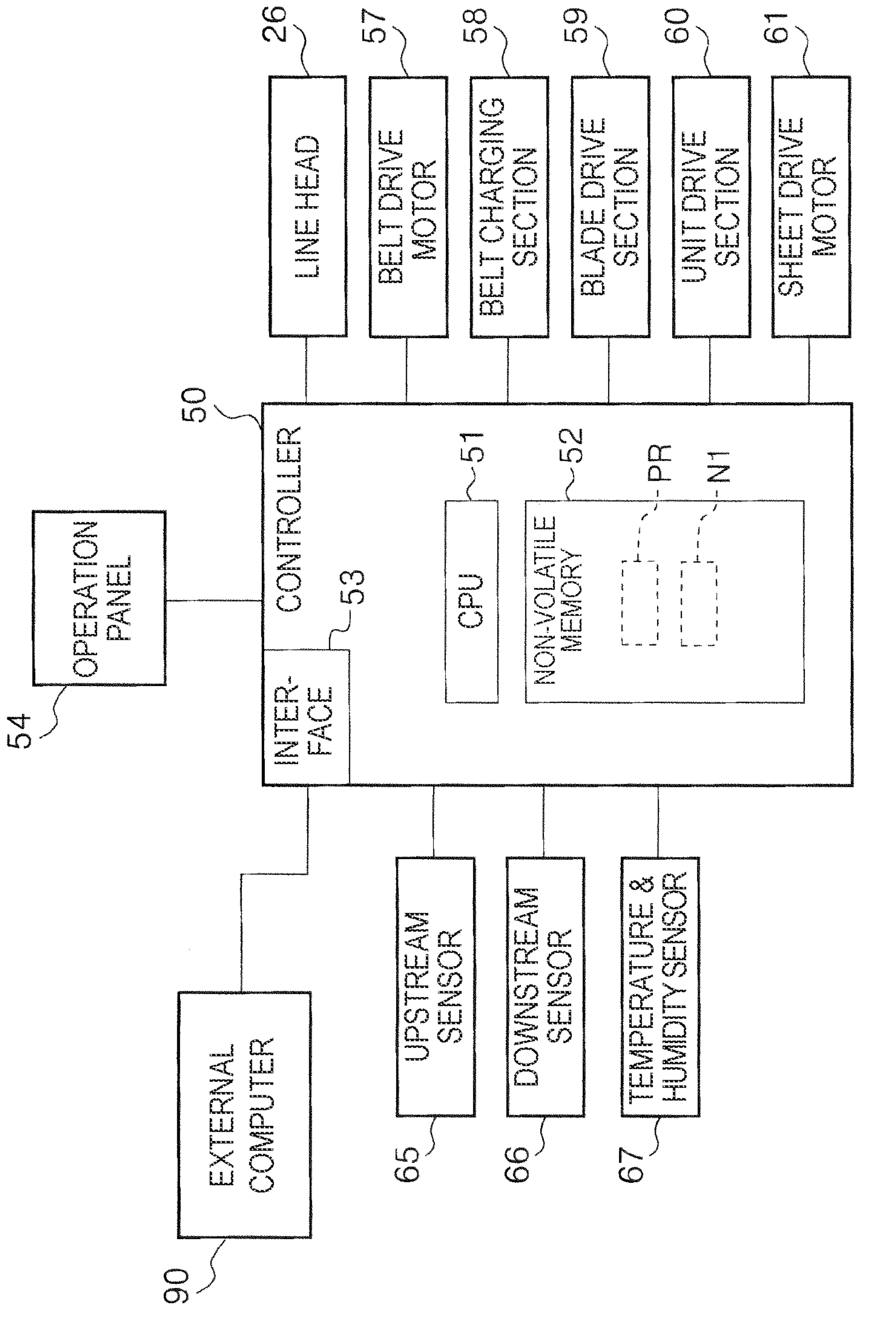
FIG. 2 is a block diagram showing a control system of the printer.

The drive pulley 31 is rotationally driven by a belt drive motor 57 (see FIG. 2) controlled by a controller 50 (see FIG. 2). When the drive pulley 31 is rotationally driven in the direction of the arrow a, the transport belt 33 rotates in the clockwise direction in FIGS. 3 and 4. Hereinafter, this rotation of the transport belt 33 may be referred to as "forward rotation".

Figure 3:
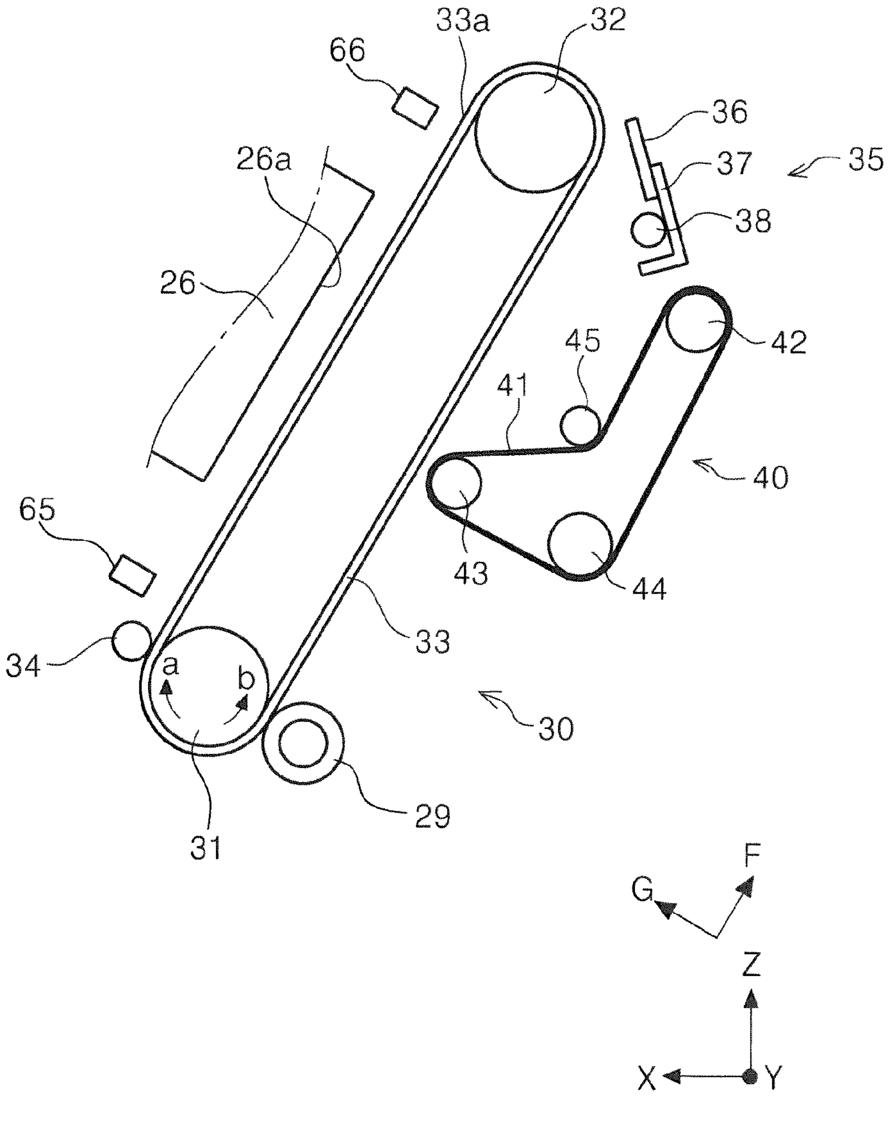
FIG. 3 is a side view of a transport belt, a first cleaning section, and a second cleaning section.
Figure 4:
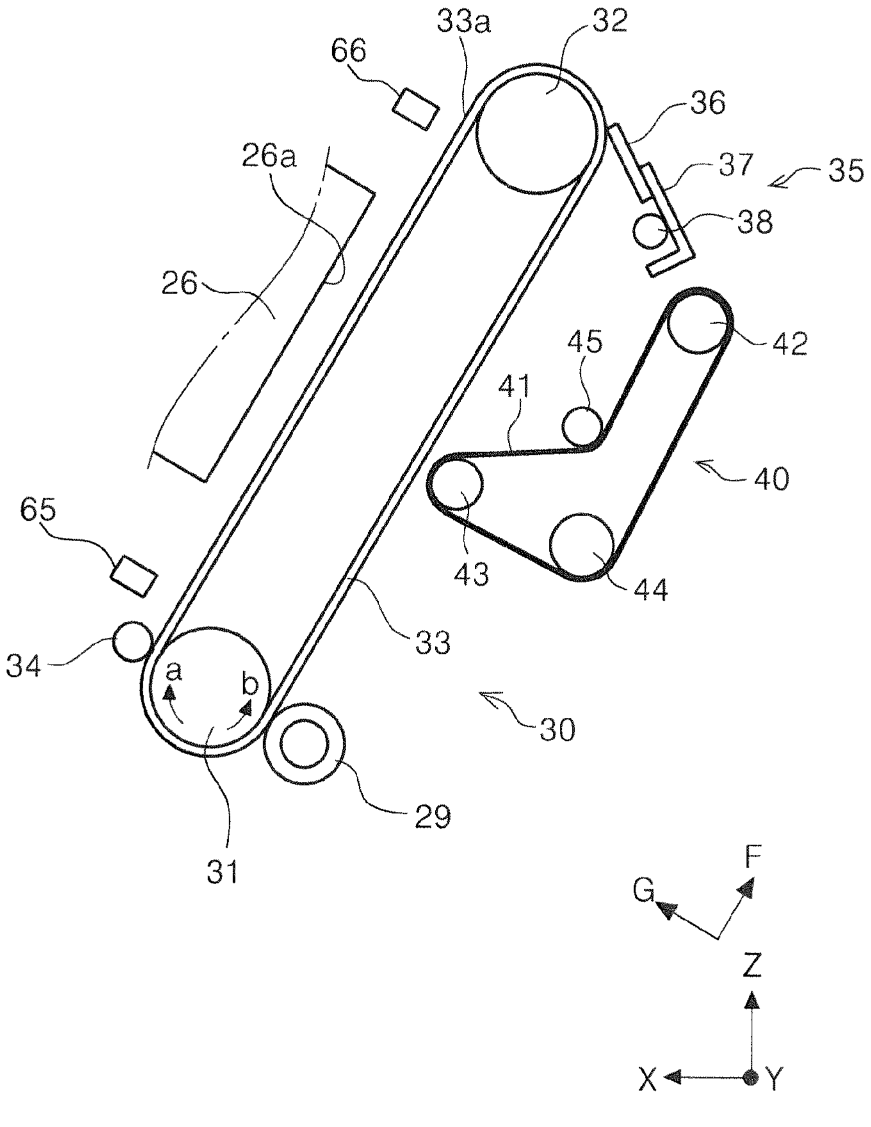
FIG. 4 is a side view of the transport belt, the first cleaning section, and the second cleaning section.

When the drive pulley 31 is rotationally driven in the direction of arrow b, the transport belt 33 rotates in the counterclockwise direction in FIGS. 3 and 4. Hereinafter, this rotation of the transport belt 33 may be referred to as "reverse rotation".

A charging roller 29 is provided at a position facing the drive pulley 31 with the transport belt 33 interposed therebetween.

The charging roller 29 is in contact with the outer surface of the transport belt 33, and is rotated in accordance with the rotation of the transport belt 33. A DC voltage is applied to the charging roller 29 by a belt charging section 58 (see FIG. 2), whereby the charging roller 29 supplies an electric charge to a portion in contact with the transport belt 33. The belt charging section 58 (see FIG. 2) is controlled by the controller 50 to switch voltage application to the charging roller 29 ON and OFF and to switch the voltage that is applied to the charging roller 29.

Note that in this embodiment, the charging roller 29 supplies a positive charge to the transport belt 33 to charge the outer peripheral surface 33*a* of the transport belt 33 to a positive polarity, whereby the outer peripheral surface 33*a* of the transport belt 33 becomes an attracting surface to which the medium clings.

A support roller 34 that contacts the medium is provided on the upstream side of the line head 26. The support roller 34 presses the medium against a portion of the transport belt 33 wound around the drive pulley 31. The support roller 34 is grounded, whereby the charge on the recording surface side of the medium is removed.

Next, a first cleaning section 35 is provided in the vicinity of the driven pulley 32. The first cleaning section 35 includes a blade 36, which is an example of a cleaning member that cleans the outer peripheral surface 33*a* of the transport belt 33. The blade 36 is fixed to a fixed member 37, and the fixed member 37 is provided rotatably around a rotation shaft 38.

As an example, the blade 36 is a plate-shaped elastic member having a predetermined thickness, is formed of urethane, rubber, or the like, and can be elastically deformed in a state of contacting the transport belt 33. The tip end portion of the blade 36 contacts the portion of the transport belt 33 that is wrapped around the driven pulley 32 to clean the outer peripheral surface 33*a* of the transport belt 33.

The rotation shaft 38 is rotated by a blade drive section 59 (see FIG. 2), and rotation of the rotation shaft 38 causes the blade 36 to switch between a contact state (see FIG. 3) in which the blade 36 contacts the transport belt 33 and a separated state (see FIG. 4) in which the blade 36 is separated from the transport belt 33. By forward rotation of the transport belt 33 forward while the blade 36 is in the contact state, deposits such as ink and paper powder adhering to the outer peripheral surface 33*a* of the transport belt 33 are removed.

The blade drive section 59 (see FIG. 2) can be constituted by an actuator such as a motor. Further, the controller 50 can adjust the pressing force when the blade 36 is pressed against the transport belt 33 by adjusting the rotation amount of the rotation shaft 38.

The second cleaning section 40 is provided below the first cleaning section 35. The second cleaning section 40 is located downstream of the first cleaning section 35 in the moving direction of the transport belt 33. The cleaning sheet 41 is wound around a drive pulley 42 and driven pulleys 43 and 44, and tension is applied to the cleaning sheet 41 by a tensioner 45. Assuming that the blade 36 is a first cleaning member, the cleaning sheet 41 is a second cleaning member.

The cleaning sheet 41 is an endless fabric in the present embodiment, and can be pressed against the outer peripheral surface 33*a* of the transport belt 33 by the driven pulley 43. The drive pulley 42 is rotationally driven by a sheet drive motor 61 (refer to FIG. 2). The drive pulley 42 is rotationally driven in the clockwise direction in FIG. 3, whereby the cleaning sheet 41 moves around in the clockwise direction in FIG. 3.

The second cleaning section 40 is provided so as to be movable in a direction in which the second cleaning section 40 advances and retreats with respect to the transport belt 33, specifically, along the G-axis direction, and advances and retreats with respect to the transport belt 33 by receiving power of the unit drive section 60 (see FIG. 2). The unit drive section 60 can be constituted by an actuator such as a motor.

When the second cleaning section 40 advances with respect to the transport belt 33, the cleaning sheet 41 is pressed against the transport belt 33 by the driven pulley 43, and the outer peripheral surface 33*a* of the transport belt 33 is wiped by forward rotation of the transport belt 33 and circumferential movement of the cleaning sheet 41 while in this state. FIGS. 3 and 4 illustrate a state in which the second cleaning section 40 is retracted from the transport belt 33, and a state in which the second cleaning section 40 is advanced to the transport belt 33 is omitted from the drawings.

The belt drive motor 57, the belt charging section 58, the blade drive section 59, the unit drive section 60, and the sheet drive motor 61 are controlled by the controller 50 as a control means as shown in FIG. 2.

The controller 50 is a controller that performs control of the entire printer 1, and controls the line head 26, a medium transport motor (not shown), and the like in addition to the configuration described above.

The controller 50 includes a CPU 51 and a non-volatile memory 52, and a program PR, various parameters, and the like for performing various types of control of the printer 1 are stored in the non-volatile memory 52. The program PR includes a program for realizing various controls described below, and various parameters necessary for executing the program PR are stored in the non-volatile memory 52. Reference symbol N1 is data necessary for a recovery operation of the transport belt 33 (to be described later).

A signal from the operation panel 54 is input to the controller 50, and a signal for displaying information is output from the controller 50 to a display section (not shown) of the operation panel 54. Various kinds of setting information input via the operation panel 54 are stored in the non-volatile memory 52. The controller 50 performs various kinds of control based on the various kinds of setting information.

The controller 50 includes an interface 53 for communicating with an external computer 90. The controller 50 acquires recording data, which is data for recording that is generated by a printer driver operating on the external computer 90, or by a printer driver included in the controller 50. Then, based on the recording data, each mechanism portion including the line head 26 is controlled. The recording data also includes size information of the medium.

Detection signals of various sensors are input to the controller 50, and the controller 50 performs necessary control based on the detection signals. FIG. 2 shows an upstream sensor 65, a downstream sensor 66, and a temperature and humidity sensor 67, which are some of the various sensors.

As shown in FIGS. 3 and 4, the upstream sensor 65 is provided at a position facing the transport belt 33 and upstream of the line head 26. Further, the downstream sensor 66 is provided at a position facing the transport belt 33 and downstream of the line head 26. Each of the upstream sensor 65 and the downstream sensor 66 is an optical sensor including a light emitting section that emits light toward the transport belt 33 and a light receiving section that receives light reflected from the transport belt 33 or medium. The controller 50 can detect the passage of the medium leading end or the medium trailing end at the position of the upstream sensor 65 based on the detection signal of the upstream sensor 65, and can detect the passage of the medium leading end or the medium trailing end at the position of the downstream sensor 66.

In particular, the controller 50 determines that a medium jam has occurred when the passage of the leading end of the medium is not detected at the position of the downstream sensor 66 even when a predetermined time has elapsed after the passage of the leading end of the medium is detected at the position of the upstream sensor 65. When it is determined that a medium jam has occurred, the controller 50 stops the recording operation. Stopping the recording operation includes stopping ink ejection from the line head 26 and stopping drive of the transport belt 33 and other transport roller pairs.

The temperature and humidity sensor 67 is provided inside the apparatus, and the controller 50 can grasp the temperature and humidity inside the apparatus based on information received from the temperature and humidity sensor 67.

In the present embodiment, the temperature and humidity sensor 67 is more preferably disposed in the vicinity of the transport belt 33. As will be described in detail later, this is because the temperature or the humidity acquired by the temperature and humidity sensor 67 in the present embodiment is used to determine whether it will be easy to dry the ink attached to the transport belt 33 or it will be difficult to dry the ink.

However, the temperature and humidity sensor 67 may be provided outside the apparatus. In addition, the temperature sensor and the humidity sensor may be provided separately, and in this case, at least one of them may be provided outside the apparatus.

In the present embodiment, the controller 50 cleans the outer peripheral surface 33*a* of the transport belt 33 using at least one of the first cleaning section 35 and the second cleaning section 40. The controller 50 can select a cleaning operation using only the first cleaning section 35, a cleaning operation using both the first cleaning section 35 and the second cleaning section 40, and a cleaning operation using only the second cleaning section 40.

A periodic cleaning operation can be raised as an example of when the controller 50 selects the cleaning operation using only the first cleaning section 35. The controller 50 is provided with a means for counting the elapsed time from the execution of the periodic cleaning operation, and executes the periodic cleaning operation when the elapsed time from the previous execution of the periodic cleaning operation reaches a prescribed time. In addition, the cleaning operation using only the first cleaning section 35 is also performed when the printer 1 transitions to the standby state after a recording job ends.

An example of when the controller 50 selects the cleaning operation using both the first cleaning section 35 and the second cleaning section 40 is when, after a medium jam occurs and the recording operation stops, the user removes the medium and presses an OK button of the operation panel 54. The controller 50 executes the cleaning operation by the cleaning operation using both the first cleaning section 35 and the second cleaning section 40 when a medium jam occurs in this manner is because there is a concern that ink was erroneously ejected onto the transport belt 33 and that the ink will adhere to the transport belt 33.

Other examples of when the controller 50 selects the cleaning operation using both the first cleaning section 35 and the second cleaning section 40 include when borderless recording is executed, wherein recording is performed by discharging ink to both the edge of the medium and to a region outside the edge of the medium without a margin at the edge of the medium, when ink is ejected from the line head 26 toward the transport belt 33 as part of maintenance of the line head 26, and the like.

The recovery operation of the blade 36, which will be described below, is triggered by the cleaning operation using both the first cleaning section 35 and the second cleaning section 40, but is not limited thereto.

Examples of when the controller 50 selects the cleaning operation using only the second cleaning section 40 include when the number of times of execution of double-sided recording reaches a predetermined value and when there is a possibility that water condensation occurs on the transport belt 33. The controller 50 is provided with a means for counting the number of times of execution of double-sided recording, and when the number of times of execution of double-sided recording reaches a prescribed value, the controller 50 executes a cleaning operation by a cleaning operation using only the second cleaning section 40. This is because, when double-sided recording is performed, a first surface on which recording is performed first contacts the transport belt 33 when recording is performed on the second surface, which is opposite from the first surface, and ink may adhere to the transport belt 33. Further, there is a concern that the medium gets wet when water condensation occurs on the transport belt 33, so the controller 50 executes the cleaning operation by the cleaning operation using only the second cleaning section 40. Examples of the when water condensation may occur on the transport belt 33 include when the humidity state rapidly changes to a high-humidity state, and when the temperature rapidly increases from a low-temperature state.

Next, the recovery operation of the blade 36 will be described. In particular, there is a high possibility that ink remains on the blade 36 after the transport belt 33 contaminated by the above-described erroneous ejection is cleaned. The amount of water of the ink remaining on the blade 36 evaporates with the passage of time, and the ink adheres to the blade 36. When the blade 36 to which ink adheres is used to clean the transport belt 33, there is a possibility that an appropriate cleaning effect cannot be obtained. Therefore, the controller 50 is configured to be able to execute the recovery operation of the blade 36.

Figure 5:
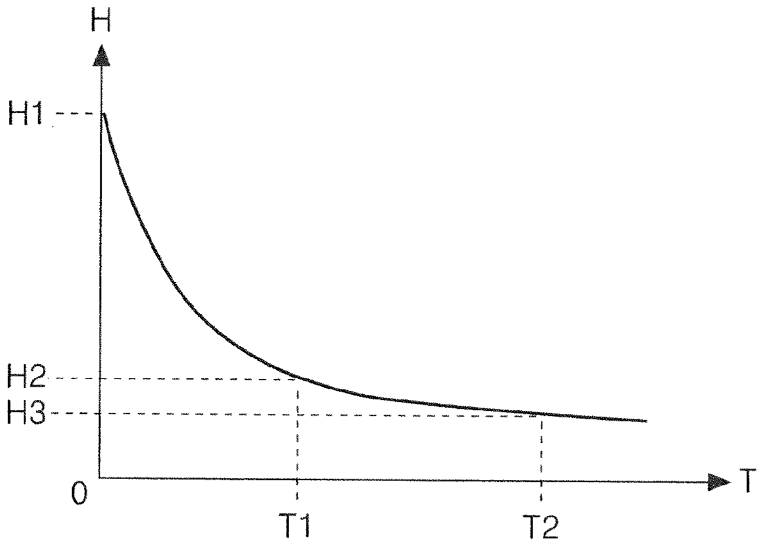
FIG. 5 is a graph showing the relationship between amount of water in ink remaining on a blade and elapsed time.

FIG. 5 shows the relationship between the amount of water H contained in the ink remaining on the blade 36 and the elapsed time T. The starting point of the elapsed time T can be set to an appropriate point in time such as the point in time when the cleaning operation of the transport belt 33 is started, the point in time when the cleaning operation is completed, or a point in time in the middle of a cleaning operation. The amount of water H1 is the amount of water at the starting point of the elapsed time T.

The amount of water H in the ink that remains on the blade 36 because of a cleaning operation of the transport belt 33 decreases with time. When cleaning of the transport belt 33 becomes adversely affected because the amount of water H decreased to, for example, H3, then the recovery operation of the blade 36 is performed after the timing at which the elapsed time T reaches the time T2.

In the present embodiment, the recovery operation of the blade 36 is performed by rotating the transport belt 33 in a state in which the blade 36 contacts the transport belt 33. Thus, at least a part of the ink remaining on the blade 36 can be dropped off and removed by friction between the blade 36 and the transport belt 33. In this case, the rotation amount of the transport belt 33 can be appropriately set, but it is preferable that the transport belt 33 is rotated one time or more.

Figure 6:
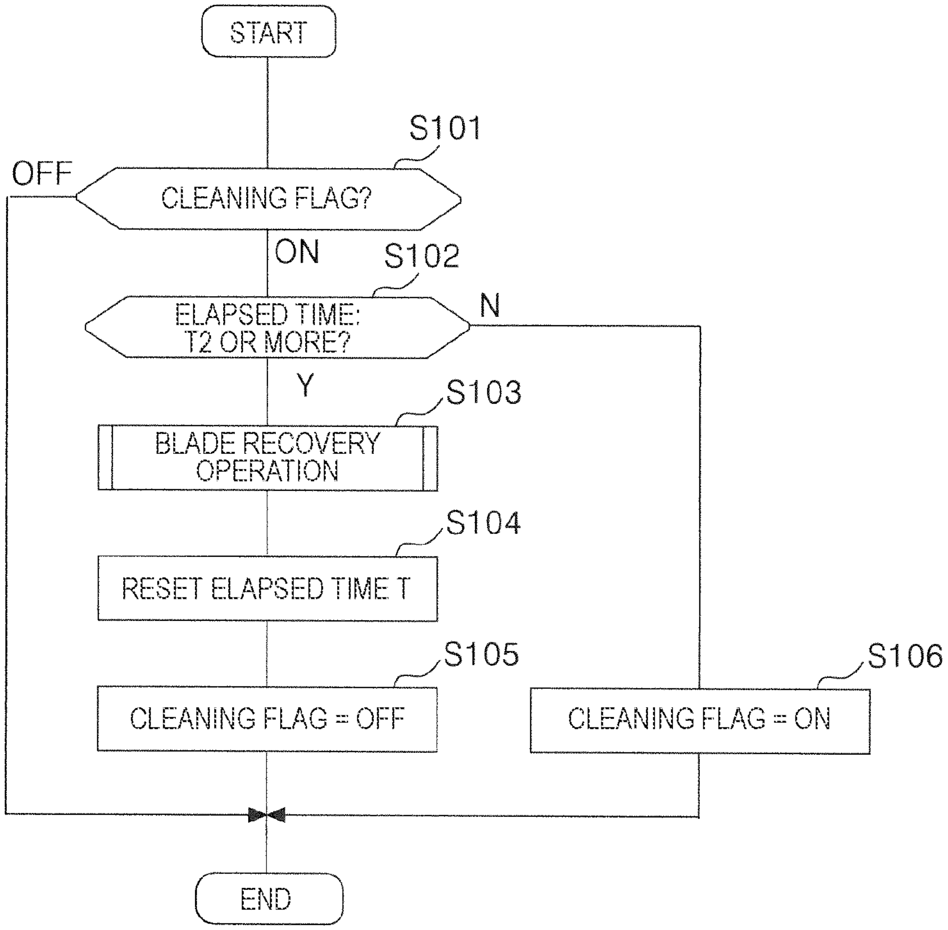
FIG. 6 is a flowchart showing flow of control for performing a blade recovery operation.

FIG. 6 is a process performed by the controller 50 at a predetermined timing, in which it is determined whether or not to perform the recovery operation of the blade 36, and the recovery operation is performed according to conditions. Examples of the predetermined timing include when the power of the printer 1 is turned ON, when a print job is completed, when the printer 1 shifts to a power saving mode, and when the printer 1 returns from the power saving mode. Needless to say, the process of FIG. 6 may be performed at other timings. In addition, the process of FIG. 6 may be performed at all of the plurality of timings illustrated above, or the process of FIG. 6 may be performed at some of the timings.

The controller 50 determines whether a cleaning flag is ON or OFF (step S101). The cleaning flag is data stored in the non-volatile memory 52 (see FIG. 2) and has a value of either ON or OFF. The situations when the cleaning flag is set to ON and when the cleaning flag is set to OFF will be described later, but when the cleaning flag is ON it means a state in which there is a high possibility that ink remains on the blade 36, for example, after a cleaning operation of the transport belt 33 is performed. When the cleaning flag is OFF, it means a state in which there is a high possibility that ink does not remain on the blade 36, for example, after the recovery operation of the blade 36 is performed.

Of course, in the process of determining whether or not to perform the recovery operation of the blade 36, it is not always necessary to use the cleaning flag as described above.

When the cleaning flag is OFF, the controller 50 ends the process. When the cleaning flag is ON, it is determined whether or not the elapsed time T is equal to or greater than time T2 (step S102). The time T2 is information stored in the non-volatile memory 52 (FIG. 2), and the controller 50 reads the time T2 from the non-volatile memory 52.

When the elapsed time T is less than the time T2 (NO in step S102), the cleaning flag is set to ON again (step S106), and the process is ended.

When the elapsed time T is equal to or greater than the time T2 (YES in step S102), the recovery operation of the blade 36 is executed (step S103), the elapsed time T is reset to zero (step S104), and the cleaning flag is set to OFF (step S105).

The elapsed time T is always counted while in a state in which the power source of the printer 1 is ON or in a state in which the printer 1 is in the power saving mode. When the power of the printer 1 is turned OFF, the elapsed time T and the date and time at which the power was turned OFF are stored in the non-volatile memory 52 (see FIG. 2). When the power supply of the printer 1 is turned ON, based on the information stored in the non-volatile memory 52 and the date and time when the power supply was turned on, the elapsed time T until then is calculated and counting is restarted.

As described above, the controller 50 can execute the cleaning operation of cleaning the transport belt 33 by the blade of recovering the cleaning 36 and the recovery operation capability of the blade 36 by rotating the transport belt 33 in a state where the blade 36 contacts the transport belt 33.

The program executed by the controller 50 and the control method realized by the controller 50 executing the program include a step (steps S302 and S306 in FIG. 10 to be described later) of executing a cleaning operation of cleaning the transport belt 33 by the blade 36 and a step (step S103) of executing, after the elapsed time T from the execution of the cleaning operation reaches the time T2, which is the set time, a recovery operation of recovering the cleaning capability of the blade 36 by rotating the transport belt 33 in a state where the blade 36 contacts the transport belt 33.

Accordingly, when ink remains on the blade 36, at least a part of the remaining ink can be removed by the recovery operation, the cleaning capability of the blade 36 can be recovered, and the transport belt 33 can be appropriately cleaned.

Further, it is possible to avoid an increase in cost and an increase in size of the apparatus as compared with when a means for dissolving the ink adhered to the blade 36 using water, a dissolving agent, or the like or mechanically removing the ink is adopted.

After performing the cleaning operation on the transport belt 33, the controller 50 performs the above-described recovery operation after a timing at which the amount of water of the ink on the blade 36 reaches a predetermined amount of water. In the above example, the predetermined amount of water is the amount of water H3 in FIG. 5. Thus, it is possible to suppress execution of an unnecessary recovery operation.

Further, in this embodiment, since the controller 50 determines the timing based on the elapsed time T, management of the timing becomes easy.

The time T2 read from the non-volatile memory 52 (see FIG. 2) can also be adjusted based on at least one of humidity and temperature. In the present embodiment, the humidity and the temperature can be acquired by a temperature and humidity sensor 67 (see FIG. 2).

For example, when the humidity is acquired and the humidity is a first humidity, the controller 50 sets the time T2 to be shorter than when the humidity is a second humidity higher than the first humidity. This is because when the humidity is relatively low, evaporation of water in the ink becomes significant.

Alternatively, when the temperature is acquired and the temperature is a first temperature, the controller 50 sets a time T2 shorter than that when the temperature is a second temperature lower than the first temperature. This is because when the temperature is relatively high, evaporation of water in the ink becomes significant.

The controller 50 can also adjust the time T2, that is, the timing, based on both temperature and humidity.

Thus, the timing for executing the recovery operation of the blade 36 can be made more appropriate.

Figure 7:
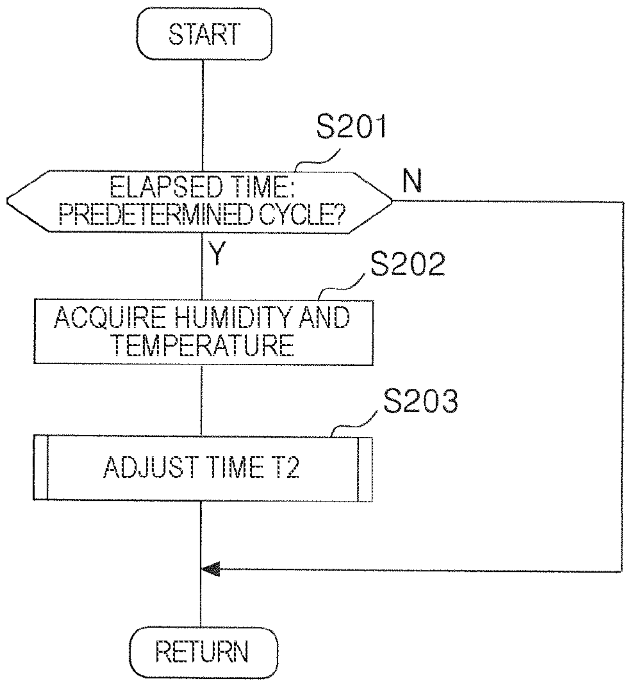
FIG. 7 is a flowchart showing a flow of a process for adjusting the timing at which the blade recovery operation is performed.

FIG. 7 shows a process of adjusting the time T2, and when the elapsed time T reaches a predetermined cycle (YES in step S201), the controller 50 acquires the humidity and the temperature (step S202). Note that the predetermined period can be set to an appropriate time interval such as 24 hours, 48 hours, or 72 hours. Further, the process shown in FIG. 7 may be performed at a predetermined timing instead of the predetermined cycle of the elapsed time T. Examples of this predetermined timing include when the power of the printer 1 is turned ON, when a print job is completed, when the printer 1 shifts to a power saving mode, and when the printer 1 returns from the power saving mode. Of course, the process in FIG. 7 may be performed at other timings. In addition, the process of FIG. 7 may be performed at all of the plurality of timings illustrated above, or the process of FIG. 7 may be performed at some of the timings.

Then, the controller 50 adjusts the time T2 based on the acquired temperature and humidity (step S203).

In addition, when the ejection duty at the time when ink was erroneously ejected to the transport belt 33 is a first ejection duty, the controller 50 may set the time T2 to be shorter than when the ejection duty is a second ejection duty, which is higher than the first ejection duty. This is because in the case of the first ejection duty, the time until the amount of water of the ink on the blade 36 reaches the predetermined amount is relatively shorter than in the case of the second ejection duty. As a result, the timing for executing the recovery operation of the blade 36 can be made more appropriate.

Here, the ejection duty is a ratio of an area to be recorded in a predetermined region of the medium or the transport belt 33, and the lower the ejection duty, the smaller the amount of ink to be ejected, and the higher the ejection duty, the larger the amount of ink to be ejected.

As the ejection duty, an ejection duty in a region where ink is actually ejected to the transport belt 33 can be adopted. Hereinafter, this is referred to as an "actual ejection duty". As an example, the controller 50 can acquire the actual ejection duty based on the ejection amount of ink ejected from when the medium leading end was detected by the upstream sensor 65 to when drive of the transport belt 33 stops, and based on the corresponding recording region. Since the actual ejection duty is based on the amount of ink actually ejected onto the transport belt 33, it can be said that the actual ejection duty reflects the state of the transport belt 33 more accurately.

As the ejection duty, an ejection duty in the entire printing area may be adopted. Hereinafter, this is referred to as "total ejection duty". The controller 50 can acquire the total ejection duty based on recording data. The total ejection duty does not need to measure the amount of ink actually ejected onto the transport belt 33, and can be calculated more easily than the actual ejection duty.

In this way, the ejection duty when ink is erroneously ejected does not mean only the ejection duty in the region where the ink is actually ejected on the transport belt 33.

The controller 50 may acquire only one of the actual ejection duty and the total ejection duty, or may acquire both of them and then adopt one of them.

Note that the amount of ink remaining on the blade 36 when the cleaning operation is performed varies depending on the area of the blade 36, the deformation state of the blade 36 while in contact with the transport belt 33, the angle, and the like, so instead of the amount of moisture actually contained in the ink remaining on the blade 36, the maximum value that can be taken by the initial amount of water (the amount of water H1 in FIG. 5) of the ink on the blade 36 may be defined as the amount of moisture H1 from the above-described viewpoint, and the time T2 may be set based on the amount of moisture based thereon.

In the above-described example, the timing at which the amount of water in the ink reaches the predetermined amount of water is determined by the elapsed time T, but the timing may be determined by calculating the amount of water in the ink on the blade 36.

The amount of water of the ink on the blade 36 can be calculated every time the elapsed time T reaches a predetermined cycle after the cleaning operation of the transport belt 33 is performed. The predetermined period can be set to an appropriate time interval such as 24 hours, 48 hours, or 72 hours. The calculation may be performed at a predetermined timing in place of or in addition to the predetermined cycle of the elapsed time T. Examples of this predetermined timing include when the power of the printer 1 is turned ON, when a print job is completed, when the printer 1 shifts to a power saving mode, and when the printer 1 returns from the power saving mode. Of course, the above-described calculation may be performed at other timings. In addition, the calculation may be performed at all of the plurality of timings illustrated above, or may be performed at some of the timings.

Figure 8:
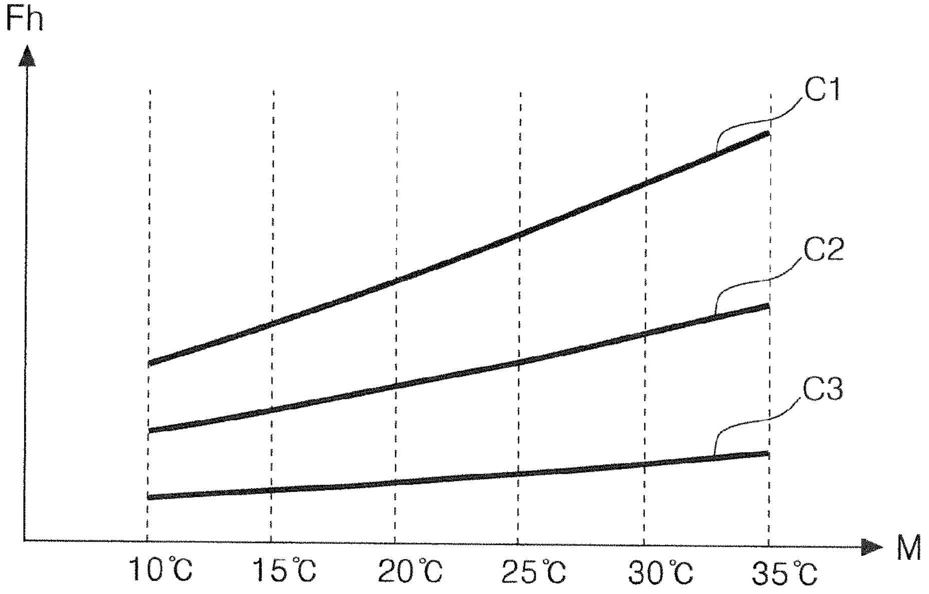
FIG. 8 is a graph showing relationship between humidity and evaporation rate of water contained in ink.

The calculation can be carried out on the basis of previously determined drying information. FIG. 8 shows the relationship between the time required for evaporation of a unit of water, that is, moisture evaporation rate Fh, and temperature M, wherein the graph C1 shows the case of 20% humidity as an example, the graph C2 shows the case of 50% humidity as an example, and the graph C3 shows the case of 80% humidity as an example. As shown in the drawing, the higher the temperature and the lower the humidity, the faster the moisture evaporation rate Fh. Such drying information is stored in advance in the non-volatile memory 52 (see FIG. 2), and the controller 50 calculates (estimates) the current amount of water H (see FIG. 5) based on such drying information and the acquired temperature and humidity.

Of course, the initial amount of water (amount of water H1 in FIG. 5), which is the basis for calculating the amount of water H, may be obtained based on the above-described actual ejection duty or total ejection duty.

In the above-described embodiments, the recovery operation of the blade 36 is performed at a predetermined timing, but the recovery operation of the blade 36 may be performed, for example, periodically and repeatedly after the cleaning operation of the transport belt 33 is performed.

Further, while the recovery operation of the blade 36 is being performed, the second cleaning section 40 may be retracted from the transport belt 33 or may be advanced to the transport belt 33. By advancing the second cleaning section 40 to the transport belt 33 while the recovery operation of the blade 36 is being performed, ink can be captured by the second cleaning section 40 when residual ink is transferred from the blade 36 to the transport belt 33.

Next, the recovery operation of the blade 36 will be further described. As described above, the recovery operation of the blade 36 is performed by rotating the transport belt 33 in a state in which the blade 36 contacts the transport belt 33.

Figure 9A:
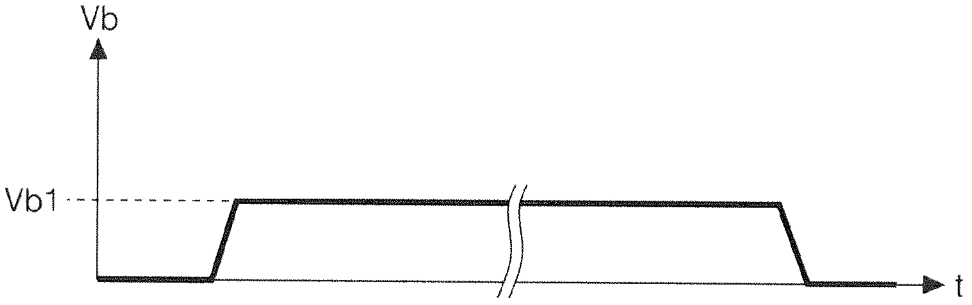
FIGS. 9A, 9B and 9C are graphs showing the moving speed of the transport belt when the blade recovery operation is performed.
Figure 9B:
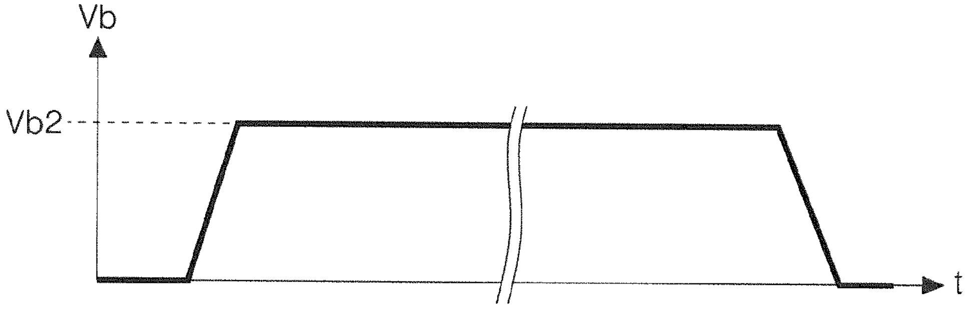

The moving speed Vb of the transport belt 33 with respect to the blade 36 can be set to a constant speed Vb1 as shown in FIG. 9A, or can be set to a constant speed Vb2 (Vb2>Vb1) as shown in FIG. 9B. The speed Vb1 is an example of a first speed, and the speed Vb2 is an example of a second speed.

Further, the controller 50 may include a first mode, in which the transport belt 33 is moved at the speed Vb1, and a second mode, in which the transport belt 33 is moved at the speed Vb2, in the recovery operation. For example, the first mode and the second mode may be alternately performed each for a predetermined time, or the second mode may be performed for a predetermined time and then the first mode may be performed for a predetermined time to end the recovery operation.

In this way, it is possible to suppress wear of the blade 36 in the first mode while reliably obtaining the effect of the recovery operation in the second mode.

Figure 9C:
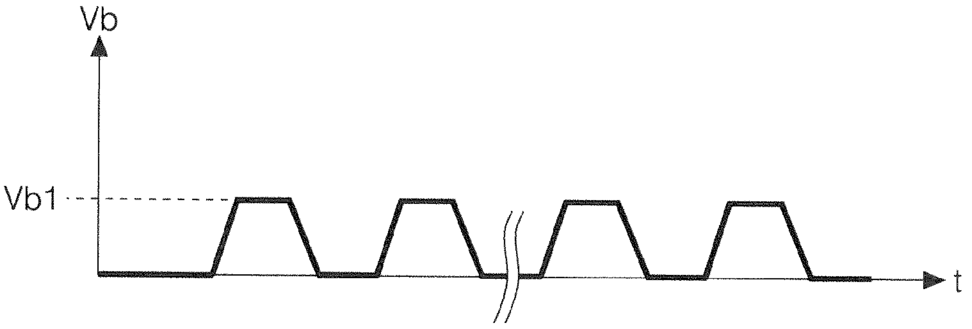

In addition, the controller 50 may include a speed change mode in which, as illustrated in FIG. 9C, the moving speed Vb of the transport belt 33 with respect to the blade 36 is periodically changed in the recovery operation. FIG. 9C shows an example in which an increase in the moving speed Vb from zero to the speed Vb1 and a decrease in the moving speed Vb from the speed Vb1 to zero are repeated. As a result, a bending motion is added to the blade 36, so the effect of removing the ink remaining on the blade 36 can be enhanced. In the example of FIG. 9C, the minimum value of the speed Vb in the speed change mode is zero, but the present disclosure is not limited thereto, and the minimum value of the speed Vb may be larger than zero.

Note that only the speed change mode may be adopted in the recovery operation, or the first mode or the second mode may be included in the recovery operation in addition to the speed change mode.

Next, control will be described for when a cleaning operation of the transport belt 33 is performed after the cleaning operation of the transport belt 33 is performed and before the recovery operation is performed.

In FIG. 5, the above-described recovery operation is performed when the elapsed time T exceeds the time T2, but there are cases when the cleaning operation of the transport belt 33 is performed before the elapsed time T reaches the time T2. In such a case, the closer that the elapsed time T is to time T2, the higher the viscosity is of the ink on the blade 36, and the cleaning capability of the blade 36 is reduced. Therefore, it is preferable to enhance the cleaning effect of the transport belt 33 as the elapsed time T is closer to the time T2.

That is, it is preferable that the controller 50 be able to execute the first cleaning operation and the second cleaning operation, which has a higher cleaning effect than the first cleaning operation, as the cleaning operation for cleaning the transport belt 33. When the cleaning operation is performed in between performing the cleaning operation and performing the recovery operation, the first cleaning operation is selected until a predetermined operation switching timing is reached, and the second cleaning operation s selected after the operation switching timing is reached. As a result, the transport belt 33 can be appropriately cleaned by compensating for a decrease in the cleaning ability of the blade 36.

The operation switching timing can be set to a time T1 shown in FIG. 5 as an example. The time T1 is a timing at which the amount of water H becomes H2.

Figure 10:
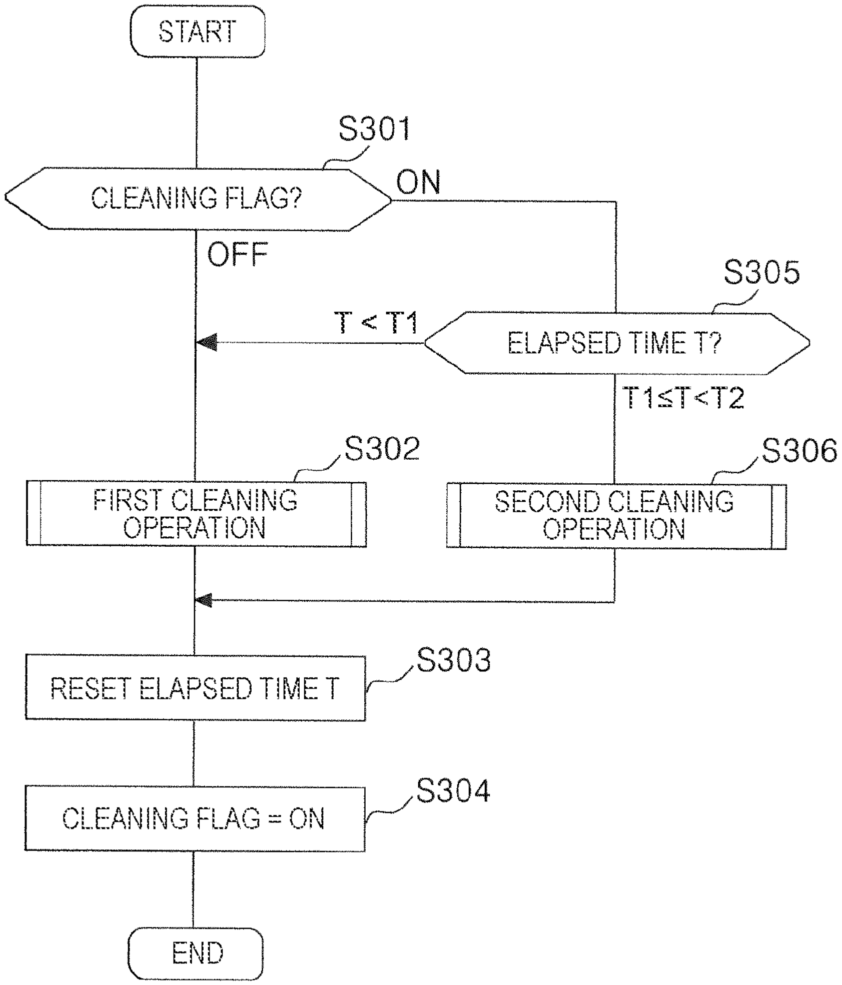
FIG. 10 is a flowchart showing flow of control when the cleaning operation of the transport belt is performed.

FIG. 10 shows flow of a process when the cleaning operation of the transport belt 33 is performed, wherein the controller 50 determines status of the cleaning flag (step S301), and cleans the transport belt 33 by the first cleaning operation when the cleaning flag is OFF (step S302). Next, the elapsed time T is reset to zero (step S303), and the cleaning flag is set to ON (step S304). After the cleaning flag is set to ON, the recovery operation of the blade 36 is performed in some cases.

When the cleaning flag is ON in step S301, the elapsed time T is determined (step S305). When the elapsed time T is less than T1, the process proceeds to step S302. When the elapsed time T is greater than or equal to T1 and less than T2, the transport belt 33 is cleaned by the second cleaning operation (step S306). Then, step S303 and the subsequent steps are executed.

By such control, the transport belt 33 can be appropriately cleaned by compensating for a decrease in the cleaning ability of the blade 36.

Note that the controller 50 increases at least one of the cleaning time, the contact pressure of the blade 36 with respect to the transport belt 33, or the moving speed of the transport belt 33 with respect to the blade 36 to be greater in the second cleaning operation than in the first cleaning operation. Examples of mode include a mode in which one of the cleaning time, the contact pressure, and the moving speed is increased, a mode in which two of them are increased, or a mode in which all of them are increased. Accordingly, the second cleaning operation having a higher cleaning effect than the first cleaning operation can be easily realized.

The above-described operation switching timing (time T1 in FIG. 5) can be adjusted in accordance with the temperature, humidity, and ejection duty in the same manner as the above-described timing (time T2 in FIG. 5) related to the recovery operation of the blade 36. Specifically, the higher the temperature is, or the lower the humidity is, or the lower the ejection duty is, the more that the operation switching timing is shifted earlier.

Further, the above-described operation switching timing may be a timing similar to the above-described timing related to the recovery operation of the blade 36, and be a timing when the residual amount of water in the ink on the blade 36 is appropriately calculated and the residual amount of water reaches a predetermined amount of water, for example, the amount of water H2 in FIG. 5. The calculation method at this time is similar to the calculation method related to the recovery operation of the blade 36 described above, and the calculation is performed using the drying information.

The present disclosure is not limited to the embodiments described above, and various modifications can be made within the scope of the disclosure described in the claims, and it is needless to say that these are also included in the scope of the present disclosure.

What is claimed is:

1. A liquid ejection apparatus, comprising:

a liquid ejection section configured to eject liquid onto a medium;

a transport belt that faces the liquid ejection section and that is configured to transport a medium by rotating; and a cleaning member that is configured to clean the transport belt by contact with the transport belt and that is switchable between a contact state of contacting the transport belt and a separated state of being separated from the transport belt; and a controller configured to control an operation of ejecting liquid using the liquid ejection section, a rotation operation of the transport belt, and state switching of the cleaning member, wherein the controller is configured to execute a cleaning operation of cleaning the transport belt by the cleaning member and a recovery operation of recovering cleaning capability of the cleaning member by rotating the transport belt in a state where the cleaning member contacts the transport belt.

2. The liquid ejection apparatus according to claim 1, wherein the controller executes the recovery operation after executing the cleaning operation and on or after a timing when an amount of water in the liquid on the cleaning member falls below a predetermined amount of water.

3. The liquid ejection apparatus according to claim 2, wherein the controller determines the timing based on an elapsed time from execution of the cleaning operation.

4. The liquid ejection apparatus according to claim 3, wherein the controller determines the timing based on an elapsed time from execution of the cleaning operation of cleaning the liquid discharged onto the transport belt.

5. The liquid ejection apparatus according to claim 2, further comprising:

a detection section configured to acquire at least one of humidity or temperature, wherein when the humidity is acquired and the humidity is a first humidity, the controller sets a time until the timing is reached to be shorter than when the humidity is a second humidity higher than the first humidity and when the temperature is acquired and the temperature is a first temperature, the controller sets the time until the timing is reached to be shorter than when the temperature is a second temperature lower than the first temperature.

6. The liquid ejection apparatus according to claim 2, wherein the controller executes the cleaning operation when liquid is erroneously ejected from the liquid ejection section onto the transport belt and when an ejection duty at time of an erroneous ejection is a first ejection duty, the controller sets the time until the timing is reached to be shorter than when the ejection duty is a second ejection duty that is higher than the first ejection duty.

7. The liquid ejection apparatus according to claim 2, wherein the controller determines the timing by calculating the amount of water in the liquid.

8. The liquid ejection apparatus according to claim 1, wherein the recovery operation includes a first mode in which the transport belt is moved with respect to the cleaning member at a first speed and a second mode in which the transport belt is moved with respect to the cleaning member at a second speed higher than the first speed.

9. The liquid ejection apparatus according to claim 1, wherein the recovery operation includes an operation of a speed change mode in which a moving speed of the transport belt with respect to the cleaning member is periodically changed.

10. The liquid ejection apparatus according to claim 1, wherein the controller is configured to execute, as the cleaning operation, a first cleaning operation and a second cleaning operation having a cleaning effect higher than that of the first cleaning operation and when the cleaning operation is performed in between performing the cleaning operation and performing the recovery operation, the first cleaning operation is selected until a predetermined operation switching timing is reached, and the second cleaning operation is selected after the operation switching timing is reached.

11. The liquid ejection apparatus according to claim 10, wherein the controller is configured to increase at least one of a cleaning time, a contact pressure of the cleaning member with respect to the transport belt, or a moving speed of the transport belt with respect to the cleaning member to be greater in the second cleaning operation than in the first cleaning operation.

12. The liquid ejection apparatus according to claim 1, wherein the cleaning member is a first cleaning member, and a second cleaning member that cleans the transport belt by contacting the transport belt is provided downstream of the cleaning member in a moving direction of the transport belt.

13. The liquid ejection apparatus according to claim 12, wherein the controller is configured to execute the recovery operation in response to execution of the cleaning operation using both of the first cleaning member and the second cleaning member.

14. A control method of a liquid ejection apparatus, the liquid ejection apparatus comprising:

a liquid ejection section configured to eject liquid onto a medium;

a transport belt that faces the liquid ejection section and that is configured to transport a medium by rotating; and a cleaning member that is configured to clean the transport belt by contact with the transport belt and that is switchable between a contact state of contacting the transport belt and a separated state of being separated from the transport belt, the control method comprising:

executing a cleaning operation of cleaning the transport belt by the cleaning member and executing a recovery operation of recovering a cleaning capability of the cleaning member by rotating the transport belt in a state in which the cleaning member contacts the transport belt on or after an elapsed time from execution of the cleaning operation reaches a set time.

15. A non-transitory computer-readable storage medium storing a program to be executed by a controller of a liquid ejection apparatus, the liquid ejection apparatus comprising:

a liquid ejection section configured to eject liquid onto a medium;

a transport belt that faces the liquid ejection section and that is configured to transport a medium by rotating; and a cleaning member that is configured to clean the transport belt by contact with the transport belt and that is switchable between a contact state of contacting the transport belt and a separated state of being separated from the transport belt, the program comprising:

executing a cleaning operation of cleaning the transport belt by the cleaning member and executing a recovery operation of recovering a cleaning capability of the cleaning member by rotating the transport belt in a state in which the cleaning member contacts the transport belt on or after an elapsed time from execution of the cleaning operation reaches a set time.

* * * * *